May 31, 1932.    P. R. HORNBROOK    1,860,388
PROCESS OF EXTRACTING OIL
Filed Sept. 10, 1926    2 Sheets-Sheet 1
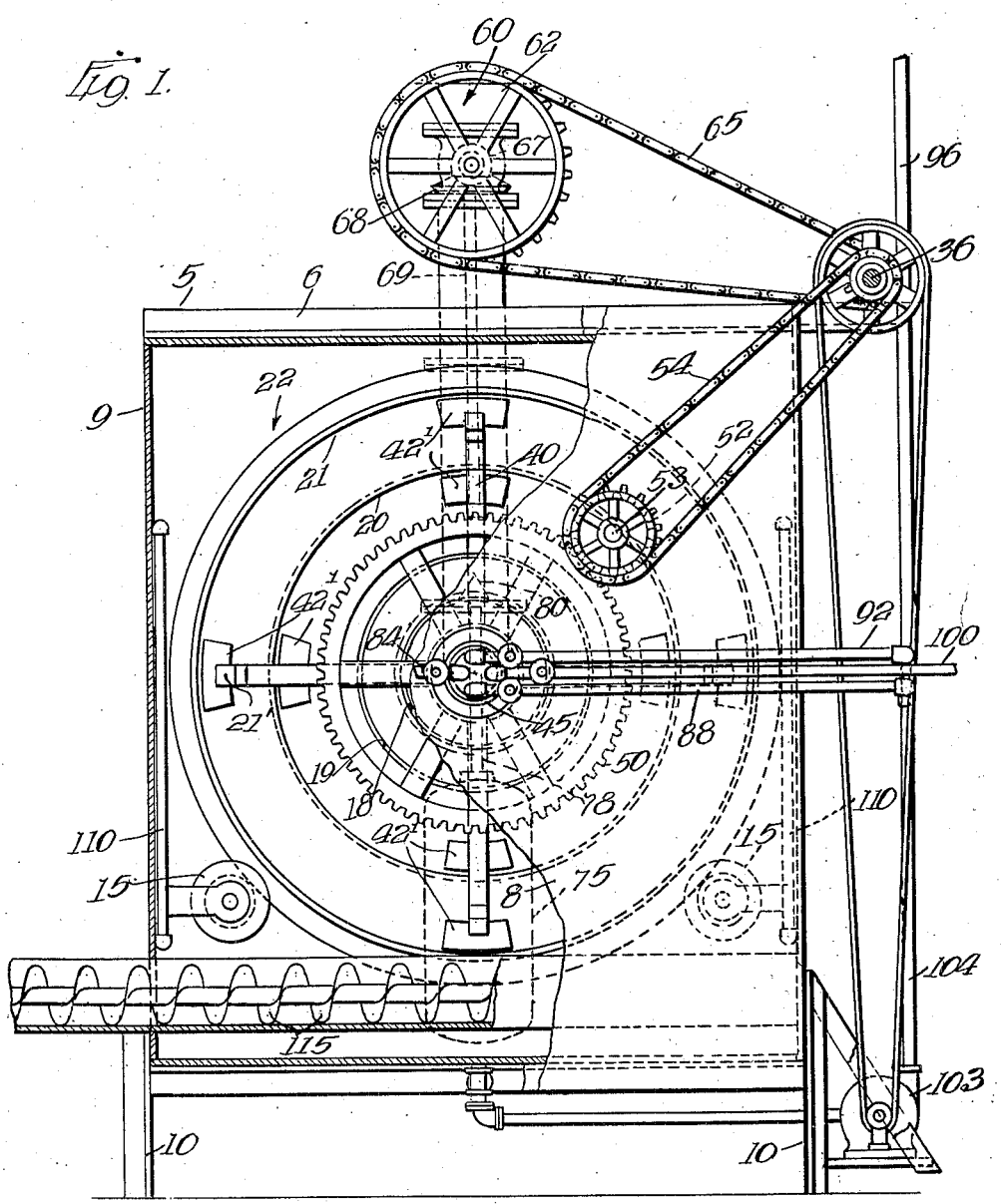

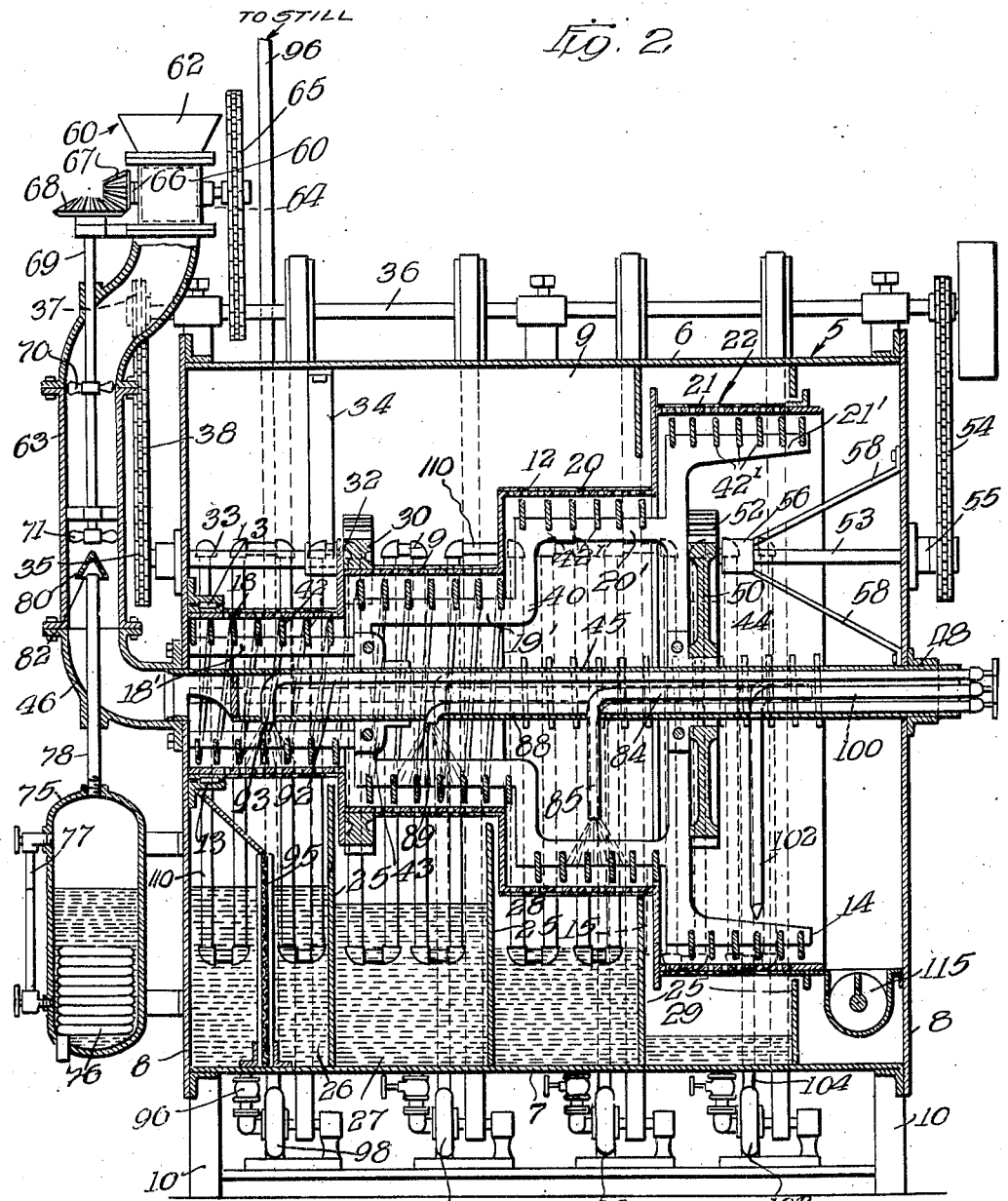

Patented May 31, 1932

1,860,388

UNITED STATES PATENT OFFICE

PHILIP R. HORNBROOK, OF NEW YORK, N. Y.

PROCESS OF EXTRACTING OIL

Application filed September 10, 1926. Serial No. 134,601.

This invention relates to a separator and process, and more particularly to a separator and process for extracting oil from linseed meal, cotton seed meal and other oil bearing materials, and its object is the provision of a generally improved and simplified separator and process for more completely separating the oil or other substance and for doing it expeditiously and in a continuous process.

The oil bearing or other material is adapted to be fed through the separator continuously in the treatment thereof and its surface exposure to the solvent for removing or extracting the oil is gradually increased as it is fed through the separator. The duration of the process, that is, the length of time during which the material is treated, is conveniently adjustable. A centrifugal washing action or a series of centrifugal washing and semi-washing actions are combined with centrifugal cleaning and drying actions, and the entrance of air and formation of explosive mixtures is prevented. The meal or other oil bearing material may be crushed, packed, and fed to the separator in a continuous process, and is fed through the separator continuously in the separating or oil extraction operations and delivered from the separator free or partially free from oil. The solvent, after passing through the stages of greater surface exposure of the oil or other solute bearing material to the solvent, may be delivered progressively to the stages of less surface exposure, and the steam employed in the drying stage may also be re-delivered as condensate to one of the preceding stages, preferably the first stage from which the oil is withdrawn and delivered to the still or other point.

To more fully acquaint those skilled in the art with the separator and process of my present invention, I shall now describe a particular embodiment of the same in connection with the accompanying drawings, in which:—

Figure 1 is an end view partially broken away of a separator embodying the present invention;

Fig. 2, is a vertical longitudinal section taken substantially on the line 2—2 of Fig. 1;

Figure 3 is a more or less diagrammatic side elevation showing the location of the heater coils.

Referring to the drawings the separator shown comprises an enclosing housing or container 5 having a top 6, bottom 7, end walls 8 and side walls 9. The container 5 is supported by legs 10, preferably with the closed bottom 7 elevated above the supporting surface.

Disposed within the container 5 is a drum 12 rotatably journaled at one end in a suitable bearing 13 on one of the end walls 8 and rotatably supported toward its opposite open end 14 on rollers 15 journaled in suitable brackets suitably secured within the container 5.

The drum 12 is of perforated metal or other pervious material and it is stepped to provide the cylindrical separator compartments 18, 19, 20 and 21 of progressively increasing size, for the different stages of separation. The drum portions 18, 19, 20 and 21 have a common axis of rotation in the bearings 13 and 15 and the surface of the drum is preferably provided with a covering 22 of suitable filter cloth. The filter cloth 22 is shown on the outside of the drum, but it may, of course, be on the inside if desired.

The interior of the container 5 is divided transversely by partitions 25 into chambers 26, 27, 28 and 29, one of which underlies each of the drum portions 18, 19, 20 and 21, respectively, so that the solvent and suspended solute which passes from the respective drum portions is maintained separated in the container 5. For this purpose one of the partitions 25 is disposed at each of the opposite ends of the drum portions 18, 19, 20 and 21, the end wall 8 of the container 5 closing the opposite end of the chamber 26. The partitions 25 may extend vertically throughout the entire height of the container, or they may extend up only to substantially the axis of rotation of the drum 5, extending, of course, transversely through the entire width of the reception chamber of the container, and dividing the same into the chambers 26, 27, 28 and 29.

For rotating the drum 12 a ring gear 30 surrounds and is secured to the periphery of the drum portion 19 to turn the drum with rotation of the gear. Meshing with the ring gear 30 is a pinion 32 fixed upon a shaft 33 to turn therewith. The shaft 33 is journaled at one end in a bracket 34 depending from the top wall 6 of the container and at its opposite end in the end wall 8 of the container, and externally of the end wall 8 the shaft 33 has a sprocket 35 fixed thereon to turn the shaft with it. A drive shaft 36 overlies and is journaled in suitable bearings on the top of the container 5 and this shaft 36 has a sprocket 37 fixed thereon to be driven thereby. The shaft 36 may be driven from any suitable source as through a suitable belt connection (not shown), and a sprocket chain 38 is trained about the sprockets 35 and 37 and drives the shaft 33 and through it the drum 12.

Rotatable within the stepped drum 12 is a stepped frame 40 which carries a stepped helical screw 42 disposed helically about the stepped portions 18' and 19' of the frame 40 having its periphery fitting snugly within the corresponding stepped portions of the drum 12 and cooperating closely with the interior of the stepped drum portions 19 and 20. The stepped portions 20' and 21' of the frame 40 are provided with blades 42' which are helically disposed with respect to each other, on the arms of the frame 40 and form a helical continuation of the screw 42 for feeding the material thru the separator. The screw frame 40 is rotatably journaled at 43 and 44 on a tube or sleeve 45 which extends axially through the drum 12, extending at one end thru the end plate 8 and into the adjacent end of an elbow 46, which connects the drum with the conduit through which the meal or other oil, or solute bearing material, is fed into the small end 18 of the drum 12. The opposite end of the sleeve 46 extends through the opposite end wall 8 of the housing 5 and through a suitable fitting 48 provided on the end wall thereof.

For rotating the screw 42 a gear 50 is suitably secured or connected to the frame 40 to turn or rotate the screw therewith. Meshing with the gear 50 is a pinion 52 suitably fixed to turn with a shaft 53 which is driven from the main drive shaft 36 as by means of a suitable driving chain 54. The shaft 53 is journaled at one end in a bearing 55 on the adjacent end wall 8, and at its inner or opposite end in a bearing 56 supported inwardly of the end wall 8 by suitable brackets 58.

The meal or other oil or solute bearing material is introduced by a feeder, designated generally at 60 and comprising a hopper 62 and a chute or conduit 63 opening axially into the small end 18 of the drum 12 through the elbow 46.

The feeder 60 is preferably in the form of a roll crusher, although it may be a feeder of previously crushed material acting as the feeder. A suitable packer 64, disposed in the feed conduit or chute 63 adjacent the hopper 62 is driven from the shaft 36 by means of a chain 65. The feeder or crusher shaft 66 carries a pinion 67 which meshes with a gear 68 on the upper end of a vertical shaft 69. The shaft 69 extends down axially through the intermediate portion of the chute or conduit 63, being suitably journaled therein, and is provided with impellers 70 and 71 which turn with the shaft 69 and impel the meal or other solute bearing material toward and into the drum 12, packing it firmly together, expelling air, and compressing so as to absorb vapor when expanding after passing the hood 80.

This manner of feeding the material to the drum keeps air from entering the drum with the material and prevents the formation of explosive mixtures within the drum.

Underlying the feeder 60 is a vaporizer 75 which may be mounted upon the adjacent end wall 8 of the housing 5, and which is provided internally with a suitable heater, shown in the form of a coil 76. The vaporizer 75 has a gauge glass 77 and a vapor outlet 78 which extends up through the wall of the chute 63 and delivers into the material as it is fed through the chute to the drum 12. The upper end of the vapor delivery tube 78 is provided with a generally conical hood 80 providing an annular passage 82 from which the vapor issues beneath it, and the hood deflects the meal or other material about and away from the upper open end of the tube 78, and prevents the material from entering or clogging the tube.

The liquid supplied to the vaporizer 75 is preferably the same as that used as the solvent in the present process although, of course, this may vary. The heater coil 76 is preferably a steam coil, although this too may vary.

The solvent, which is preferably carbon tetrachloride, naphtha, or any other solvent which will separate the oil or other solute from the meal or other material containing the same, is delivered from a suitable source through a pipe or duct 84 to the third stage or compartment 28 of the drum 12. The pipe 84 enters one end of the sleeve 45 and extends therethrough, being bent so as to extend radially through the sleeve 45 in the compartment 28. The radially turned portion of the pipe 84 is indicated at 85 and the solvent issues therefrom and passes through the meal, or other material, disposed about the drum portion 20, through the pervious drum portion and covering and into the compartment 28 from which the solvent, and such solute as is now carried thereby, may be withdrawn by means of a suitable pump 86 and delivered by a pipe or duct 88 to the second stage or compartment 27 of the drum.

Like the pipe 84 the pipe 88 enters one end of the sleeve 45 and extending therethrough is turned radially and opens through the sleeve 45 and into the drum portion 27. The radially turned end of the pipe 88 is indicated at 89, and the supply through the pipe 88 issues from this radially turned end 89 and passes through the material in the drum portion 19 and through the pervious wall of the drum and its covering, and into the compartment 27.

The contents of the compartment 27 may be drawn off by a pump 90 and delivered through a pipe 92 to the first stage or compartment 26. The pipe 92 also extends through the sleeve 45 and is turned radially at 93 to discharge through the material in the drum portion 18 and through the pervious wall of the drum portion 18 and its covering into the compartment 26.

The compartment 26 is preferably divided by a vertical filter 95 with the flow from the drum entering the compartment 26 on one side of the filter 95, and the outlet 96 to the still or other point leading from the compartment 26 on the opposite side of the filter 95. This prevents any meal, or other foreign or undesirable substances which may find their way to the compartment 26, from entering the line 96 which leads from the separator. The line 96 may be provided with a suitable pump 98 for withdrawing the oil bearing solvent from the compartment 26 on one side of the filter 95, and delivering it to a still for distilling out the oil, or to any other suitable point.

A pipe 100 also enters the sleeve 45 and is bent radially to extend therethrough within the drum portion 21. The radially turned portion 102 of the pipe 100 delivers steam through the material in the drum portion 21, and thru the pervious wall of the drum and its covering to the compartment 29, from where the steam and solvent condensate may be withdrawn by a pump 103 and delivered through a pipe connection 104 to the pipe 92 which delivers the contents of the compartment 27 to the drum portion 18, to be supplied therewith to the drum portion 18, or first stage of separation.

The centrifugal pumps 86, 90, 98 and 103 may be driven from the overhead drive shaft 36 by means of belts 200, 201, 202 and 203 trained over pulleys 204, 205, 206 and 207 respectively on the drive shaft 36 and over suitable pulleys on the respective pump shafts, as shown.

The sides of the compartment 21 are preferably provided with vertical steam coils 110 (Figures 1 and 3) for aiding the drying action along the drum portion 21. These heater coils 110 may, of course, extend further through the housing 5, or they may be disposed otherwise through the compartment 29, as desired. The heater coils 110 are shown as being disposed at opposite sides of the enclosure 5, with their upper portions extending along the sides of the drum and their lower portions extending down into the chambers 26, 27, 28 and 29, as shown in Fig. 2.

In operation the ground up linseed meal, cotton seed meal, or other material containing the oil or other solute which it is desired to recover, is delivered to the hopper 62. The feeder 60 feeds or crushes the material and feeds it through the chute 63 axially into one end of the drum portion 18. The feeder by its crushing and packing action prevents the entrance of air with the material, and as the material is fed to the drum the vaporizer 75 discharges solvent into the material as it passes through the chute 63.

The driving connections for the drum 12 and screw 42 are set to rotate the drum and screw in the same direction as the material is fed into the drum. The speeds of rotation of the drum and screw are, however, different, and it is this differential or the relative speeds which changes the rate of feed of the material through the drum and thereby the length or duration of the process.

The drum is connected to be driven at a slower speed than the screw 42. The limits of speed of rotation of the drum depend upon its size and the relative speeds of the drum and screw are determined by the length of time of the process. That is, the capacity for a given size machine and maximum speed is limited only by the construction of the drum and the minimum speed is limited to that speed at which the material ceases to adhere in a layer to the inner periphery of the drum.

As the oil bearing material enters the drum portion 18 it is distributed about the inner periphery thereof, and the pitch of the helical screw 42 and blades 42' coupled with the differences in the speeds of rotation of the drum and screw, causes the screw and blades to feed the material longitudinally of the drum to the second stage or drum portion 19, wherein due to the greater size of the drum portion 19 the material is spread and its surface exposure to the solvent or other liquid increased.

Similarly, the material is fed onto the next drum portion 20, where it is still further spread and its surface exposure still further increased, and onto the next drying drum portion 21 where it is again spread and its surface exposure again increased.

From the drum portion 21 the oil free and dried meal is delivered by the pitch of the blades 42' and the relative rotation of the blades and drum to a screw conveyor 115 by means of which the oil free and dried meal or other material may be delivered to any desired point. The conveyor 115 is preferably provided with suitable means such as the screw formation of the conveyor 115 itself, as shown, for excluding air from the housing 5, although, of course, the steam would tend to drive out any air which might tend to enter.

From the foregoing it will now be apparent that the process is a continuous one with a gradual thinning and spreading of the oil bearing material as it is fed through the drum, and a gradual concentration of the oil in the solvent up to the compartment 26 from which it is withdrawn from the separator. The oil bearing material is gradually spread and thinned out as it passes from the inlet end of the drum, and the solvent is gradually concentrated oppositely toward that point. The washing and separating actions are at least partially centrifugal ones and the drying action in the drum portion 21 is also a centrifugal one. The separation is complete and expeditious and there is no danger from explosions, or the like. Also stopping and starting for recharging and continuing the process are avoided, and the time intervals or duration of the process may be conveniently adjusted by changing the relative speeds of rotation of the screw 42 and drum 12.

The enlargement of the drum portions 18, 19, 20 and 21, one over the other from left to right or with the movement of the oil bearing material through the drum, increases the surface exposure and thins the oil bearing material in its movement through the drum. The drum portion 19 gives the material a greater surface exposure than the drum portion 18, the drum portion 20 a greater surface exposure and thinner condition than the drum portion 19 and the drum portion 21 a greater surface exposure and thinner condition than the drum portion 20.

In operation, clean solvent is pumped from a source of supply into the compartment 28 being pumped from the compartment 28 to the compartment 27, then to the compartment 26 and then to the stills, in the manner already pointed out. The compartment 26 and vaporized chamber 75 have a pipe connection 221 and there is no level maintaining provision for the compartments except for the compartment 26 where the pump take-off 220 is above the heating coils 76 to assure a certain level in the vaporizer chamber 75.

The temperature in the vaporizer chamber 75 is to be above the vaporization point of the solvent. The solvent vapor comes in contact with the oil bearing material as this solvent vapor is expanding due to having passed the restriction provided by the conical hood 80 and the vapor is absorbed and condensed, better preparing the material for the release of oil in the presence of the solvent.

The temperature of the live steam used is preferably from 212 degrees Fahrenheit to superheat sufficient to dispel solvent from the material. It should be noted that the application of the steam along the drum portion 21 is in jet form, acting under pressure on a small portion of material at a given time. This is to dispel and vaporize the solvent simultaneously using the centrifugal action to throw off the condensate. No means is shown within the apparatus for separating the condensed steam and solvent. This may be done in the still and condenser, making the separation of oil and solvent not a part of this apparatus, although the present invention is intended to apply whether this separation is in the separating apparatus shown or in a separate apparatus. The entire apparatus may be vented to the condenser for relieving pressure due to solvent or water vapor.

The water delivered into the compartment 29 by the steam treatment of the material in the region adjacent this compartment may be delivered into the pipe line 92, along with the oil and solvent to be separated out at the distilling apparatus, or otherwise as desired, or the water may be separated out directly at the compartment 29, or at any other desired point.

I claim:—

1. The process of separating oil from an oil bearing material which comprises, moving the material in a continuous path, gradually spreading the material in its movement along said path to thin the material, increase the surface exposure thereof and to give the material different thicknesses, delivering a solvent thru different thicknesses of the material across its path of movement and through the thinned portion thereof for the purposes of extracting the oil therefrom and withdrawing the solvent and extracted oil.

2. The process of separating oil from an oil bearing material which comprises, moving the material in a continuous path, gradually spreading the material in its movement along said path to increase the surface exposure thereof, delivering a solvent thru the material along a region of greater exposure and withdrawing the solvent passed thru said region of greater exposure and redelivering same to the material along a region of less exposure.

3. The process of separating oil from an oil bearing material which comprises, moving the material in a continuous path, gradually spreading the material in its movement along said path to increase the surface exposure thereof, delivering a solvent thru the material along a region of greater exposure, withdrawing the solvent passed thru said region of greater exposure and redelivering same to the material along a region of less exposure and drying the material by passing steam across its path of movement and along a region of greater exposure beyond the region of delivery of the solvent to the material.

4. The process of separating oil from a material bearing same which comprises, moving the material in a continuous path, gradually spreading the material in its movement along said path to increase the surface exposure thereof, passing a solvent thru the material along a region of greater exposure, withdrawing the solvent passed thru said region of greater exposure and redelivering it to the material along a region of less exposure, withdrawing and delivering the solvent from the region of less exposure to a still, and drying the material by passing steam across its path of movement along a region of greater exposure and beyond the delivery of solvent to the material.

5. The method of separating oil from an oil bearing material which comprises spreading the material to thin same, applying to the oil bearing material a solvent adapted for separating the oil therefrom and applying a vapor of the solvent to relatively compacted region of the oil bearing material and prior to the application of the solvent thereto to prepare the material for the release of the oil in the presence of the solvent.

6. The method of separating oil from an oil bearing material which comprises centrifugally disposing the material in a surrounding ring, moving the ring of material axially, increasing the diameter of the ring and thinning the ring of material in its axial movement and toward the region of completion of the process and delivering a solvent through the material and across its path of movement.

7. The method of separating oil from an oil bearing material which comprises centrifugally disposing the material in a surrounding ring, moving the ring of material axially, increasing the diameter of the ring and thinning the ring of material in its axial movement and toward the region of completion of the process and treating the material with a solvent for extracting the oil therefrom.

8. The method of separating oil from an oil bearing material which comprises centrifugally disposing the material in a surrounding ring, moving the ring of material axially, thinning the ring of material in its axial movement, treating the material with a solvent prior to its thinnest stage and applying steam at the thinnest stage for drying and removing excess moisture.

9. The method of separating oil from an oil bearing material which comprises moving the material in generally ring-like formation, thinning the material in its movement by increasing the diameter of the ring-like formation toward the region of completion of the process and passing solvent through the ring-like formation of material.

10. The method of separating oil from an oil bearing material which comprises moving the material in generally ring-like formation, thinning the material in its movement by increasing the diameter of the ring-like formation toward the region of completion of the process and passing solvent through the material at different points along the path of movement and through regions of the material of different thicknesses.

11. The method of separating oil from an oil bearing material which comprises moving the material in generally ring-like formation, thinning the material in its movement by increasing the diameter of the ring-like formation toward the region of completion of the process, passing solvent through the material at different points along the path of movement and through regions of the material of different thicknesses, and maintaining the solvent passed through different regions of the material at different points along the path of movement separated after passage through the material.

12. The method of separating oil from an oil bearing material which comprises moving the material in generally ring-like formation, thinning the material in its movement by increasing the diameter of the ring-like formation toward the region of completion of the process, passing solvent through the material at different points along the path of movement and through regions of the material of different thicknesses, and maintaining the solvent passed through different regions of the material at different points along the path of movement separated after passage through the material, the solvent passed through the material along the region of one thickness constituting after passage through the material a source of solvent supply for the material along a region of another thickness.

13. The method of separating oil from an oil bearing material which comprises moving the material in generally ring-like formation, thinning the material in its movement by increasing the diameter of the ring-like formation toward the region of completion of the process, passing solvent through the ring-like formation of material and passing steam through said ring-like formation of material beyond the passage of solvent through said material.

14. The method of separating oil from an oil bearing material which comprises moving the material in generally ring-like formation, thinning the material in its movement by increasing the diameter of the ring-like formation toward the region of completion of the process, passing solvent through the ring-like formation of material, passing steam through said ring-like formation of material beyond the passage of solvent through said material and withdrawing the solvent passed through the material and delivering same to a still.

15. The method of separating oil from an oil bearing material which comprises moving the material through a region of solvent treatment, thinning the material in its movement through said region, to give the material different thicknesses in its passage through said region, and passing solvent through different thicknesses of said material.

In witness whereof, I hereunto subscribe my name this 27th day of August, 1926.

PHILIP R. HORNBROOK.